United States Patent [19]

Gorder

[11] 4,280,711
[45] Jul. 28, 1981

[54] PERSONNEL CARRIER FOR WEED CONTROL

[76] Inventor: Paul R. Gorder, Rte. 1, Box 88, Wahpeton, N. Dak. 58075

[21] Appl. No.: 266

[22] Filed: Jan. 2, 1979

[51] Int. Cl.³ .......................................... A01D 67/04
[52] U.S. Cl. ................................................. 280/32.5
[58] Field of Search ...................... 280/32.5, 638, 412, 280/413, 411 R; 224/42.43, 42.44; 47/1.43; 414/508

[56] References Cited

U.S. PATENT DOCUMENTS

| | | | |
|---|---|---|---|
| 2,473,587 | 6/1949 | Huston | 414/508 |
| 3,194,575 | 7/1965 | Cullifer | 280/32.5 |
| 3,537,236 | 11/1970 | Fridley | 414/508 |

*Primary Examiner*—John P. Silverstrim
*Assistant Examiner*—Randall A. Schrecengost
*Attorney, Agent, or Firm*—Williamson, Bains, Moore & Hansen

[57] ABSTRACT

A personnel carrier particularly suited for use in agricultural weed spraying is designed to be pulled behind a tractor having a standard three-point hitch. The carrier has two wings that extend laterally and forwardly from the attachment point behind the tractor at an angle of approximately 45°. Platforms are provided on each wing for personnel to spray weeds from and wheels are located at the outer end of the wings to aid in support and balance of the device. A pair of skids whose lateral spacing corresponds to that between the front wheels of the tractor is located at the rear of the device and serves to support a large portion of the weight of the device in conjunction with the three-point hitch.

10 Claims, 4 Drawing Figures

PERSONNEL CARRIER FOR WEED CONTROL

BACKGROUND OF THE INVENTION

In the past, weeding of agricultural crops has generally been a very inefficient process. Generally weeding has been performed individually with farm laborers walking in the field and either manually or chemically attempting to control the weeds. For one wishing to chemically control the weeds, the laborer must carry a source of chemical, generally in the form of a pressurized tank, with him. Such heavy and unwieldy apparatus tends to tire the worker as well as limiting his mobility from his path. The laborer also must take care where he steps in order not to damage any of the corp which is growing. Finally such manual methods are often quite slow, especially when weed growth is light and the laborer is limited by the speed at which he can walk.

Various devices such as those showing U.S. Pat. Nos. 775,456, 823,034, 1,504,846, 2,267,234, 2,524,181 and 2,861,703 have been proposed for carrying workers through the field in order to harvest crops. In general, these devices carry the worker in horizontal position beneath laterally disposed wings which extend outwardly perpendicular to the direction of travel of the machine. Such devices are decidedly unsuited for weed control for several reasons. First, the perpendicular disposition of the lateral structures provides little chance for the worker to view a plant or row of plants from various angles so as to have a better view of possible weeds. Also, all the prior devices unduly restrain and restrict the freedom of movement of the worker which is highly desirable on weed control. The aforesaid harvesting devices limit the worker's access to one row.

It is therefore an object of the instant invention to provide a device which will serve to carry personnel through a field for weed control and which allows optimum viewing of the plants and rows to be weeded and which allows the worker the most freedom of movement in order to effect the weed control. It is also an object of this invention to provide a device which is light in weight, easily and inexpensively manufactured, and which is easily adopted to and maneuvered by various conventional tractors.

SUMMARY OF THE INVENTION

The device of the instant invention is designed for attachment to a conventional tractor three-point hitch and has a generally rectangular frame extending rearwardly from the hitch attachment points. At the rear of the rectangular frame are located two skid members which bear a substantial portion of the weight of the device and which are spaced so as to allow the skids to follow the tractor from wheels. Tractor front wheels are generally provided with single ribbed tires which form a grove or which follow a grove which may already be formed in the ground between the crop rows. The spacing of the skids is such that by the skids following the preformed grove, stability of the personnel carrier is enhanced longitudinal. A round tracking rod is provided on the bottom of the skid and rides in the afore-mentioned grove. The skids are provided with provision for vertical adjustment depending of the height which one desires to set the platform above the ground. The adjustment may be made by a multiplicity of vertically spaced holes in the upright attachment portions of the skid.

Two platform wings extend outwardly and forwardly from the aforementioned rectangular frame and consist generally of a skeletal framework having a plywood walkway fastened thereto. Skeletal guardrails are provided on the rear side of the platform to restrain the occupants of the platform. Located at the forward and outward end of each wing is a guide wheel which serves to support and stabilize the outer end of the platform. The guide wheel may also be adjusted in height as desired. Additionally, another set of skids may be provided at the forward-end of the frame although generally the three-point hitch serves to support a majority of the load imposed at the forward-end of the frame and such forward skids are seldom required.

These and other objects and advantages of my invention will appear more fully from the following description made in conjunction with the accompanying drawings wherein like reference characters refer to the same or similar parts throughout the several views.

DESCRIPTION OF THE DRAWING FIGURES

DESCRIPTION OF THE PREFERRED EMBODIMENT

Figure 1:
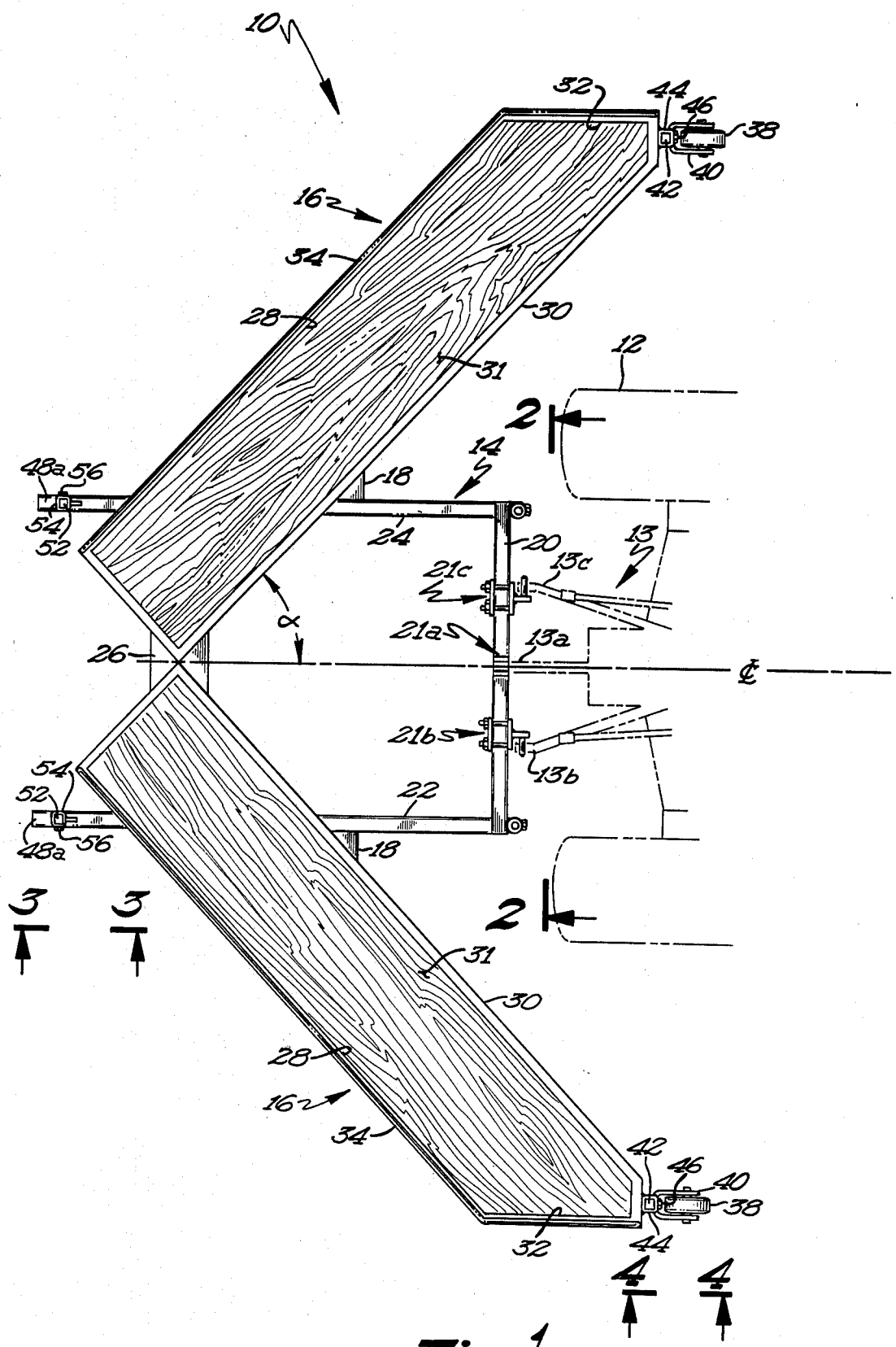
FIG. 1 is a top plan view of the invention with the tractor which it is attached shown in phantom.

Referring now to the drawings, FIG. 1 shows an overall view of the device. The carrier, generally designated 10, is attached to a conventional tractor 12 (shown in phantom) having a three-point hitch 13 of the type well-known in the art and having attachment points 13A, 13B and 13C thereon.

Carrier 10 is provided with a generally rectangular frame 14 having a front cross member 20 and parallel side member 22 and 24 extending rearwardly from front member 20. A rear cross member 26 connects side rails 22 and 24 and serves as a support over which the inner ends of wings 16 may be attached.

A pair of wing sections 16 extend laterally from frame 14 at an angle $\alpha$ with respect to the centerline shown in FIG. 1. Of course, the direction of travel is to the right in FIG. 1 along the centerline shown. It is desired to have wings 16 extend at an angle $\alpha$ relative to the centerline so that the laborers on the platforms 31 can have a relatively prolonged view of the side of the rows so that weeds therein can be controlled. Although the wings 16 may extend laterally and rearwardly to effect the desired result, it is preferred to have wings 16 extend forwardly as shown as such a configuration is more compact as well as yielding an improved weight distribution. While angle $\alpha$ is about 45° in the preferred embodiment, it may range from 20° to 70° without departing from desired results of the invention. Wing section 16 consists of front and rear rails 30 and 28 respectfully, covered by a plywood platform 31. Gusset members 18 are provided and assist in connecting frame side rails 22 and 24 to wing front rail 30. Wing end members 32 connect front and rear rails 30 and 28 respectfully at the outboard end of wing 16.

Guard rails 34 are provided across the back side of platforms 31 and are spaced vertically from platform 31 by upright member 36.

Figure 4:
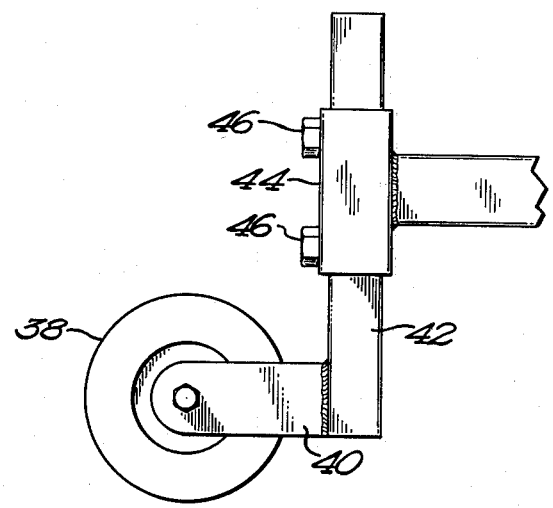
FIG. 4 is a view taken along lines 4—4 of FIG. 1.

As shown particularly in FIG. 4, guide wheels 38 are located at the front of the outward end of wing section 16. A sleeve 44 is mounted to the front of wing 16 and has slidably located therein an upright 42 having a plurality of apertures which may be used to adjust the height of the platform by variably inserting bolt 46. Wheel fork 40 is attached to upright 42 and rotatably mounts guide wheel 38 therein.

The device 10 attaches to the three-point hitch 13 on tractor 12 on attachment points 21A, 21B and 21C located on frontrail 20. Attachment points 21A, 21B and 21C attached to corresponding portions of three-point hitch 13A, 13B and 13C as might be expected. Such attachment means are entirely conventional and do not form part of the present invention. Of course any other suitable attachment means may be used as desired which are capable of supporting the weight of the forward portion of the personnel carrier 10.

Figure 2:
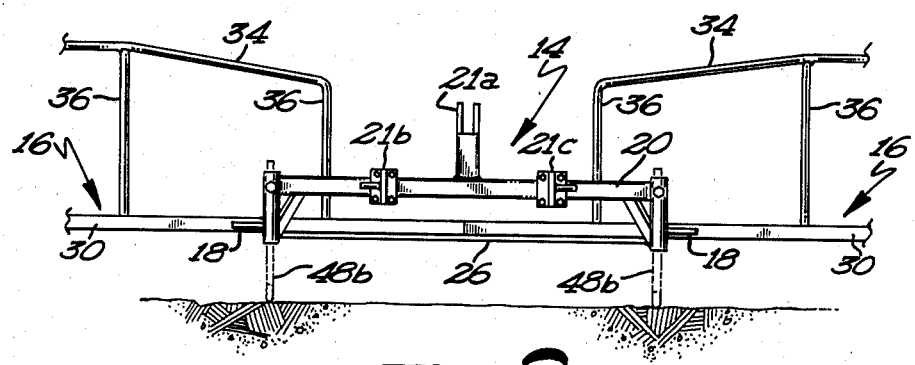
FIG. 2 is a partial front view taken along lines 2—2 of FIG. 1.
Figure 3:
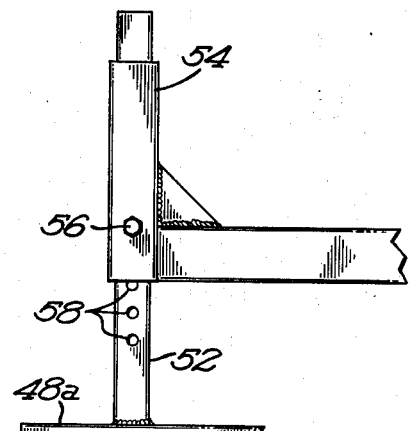
FIG. 3 is a view taken along lines 3—3 of FIG. 1.

FIG. 3 shows in detail the mounting of skids 48 to frame siderails 22 and 24. In the preferred embodiment, skids 48 are located only at the rear of the device 10 with the rear skids designated 48A. The same method of attachment described hereinafter may be used to provide front skids 48B at the intersection of front rail 20 and side rails 22 and 24 (shown in phantom in FIG. 2) where the attachment to the tractor is not as capable of supporting such weight. A skid 48 having a generally rectangular cross section is attached to the bottom of upright 52 having a plurality of apertures 58 therein. Upright 52 is slidably located in sleeve 54 and bolt 56 may be inserted through sleeve 54 into any of the various apertures 58 to adjustably locate the frame 14 relative to the ground. A tracking rod 50 of round cross section is attached longitudinally to the bottom of skid 48. Particularly in the cultivation of sugar beets, it is common practice to attach a tool to the planting implement which scores grooves into the ground between the rows of plants. Thereafter, the front tires of the tractor, which are generally single ribbed, will automatically ride in those groves and automatically steer the tractor thereby lessening the amount of attention required by the operator. By providing tracking rods 50 on the bottom of skids 48 at a corresponding lateral spacing, an additional stability of the platform is imparted which allows it to follow the tractor naturally and easily with a minimum of attention and also assuring that the personnel carrier will not sway from side to side as it moves through the field.

It is appreciated that the height of the platforms 31 may be varied by adjustment of the skids 48 and guide wheels 50 as detailed previously.

While the preferred embodiments of the present invention have been described, it should be understood that various changes, adaptations and modifications may be made therein without departing from the spirit of the invention and the scope of the appended claims.

I claim:

1. A personnel carrier adapted to be attached to a vehicle for carrying workers through fields in order to perform crop and/or weed control operations, comprising:
a main frame having means thereon for attachment to a vehicle for conveying said frame through a field;
ground engaging skid means supporting said frame for transit;
a pair of wing sections having platform means thereon for carrying workers, said wing sections having inner end segments supported on said main frame and said wing sections projecting horizontally outwardly from said inner end segments on opposite sides of said main frame at an angle of between 20° and 70° with respect to the longitudinal axis of said main frame, said platform means being spaced from the ground so as to allow weed control operations to be performed therefrom; and
ground engaging wheel means on each of said wing sections at locations thereon spaced laterally outwardly from said main frame.

2. A personnel carrier as defined in claim 1 wherein: said attachment means comprises three laterally spaced bracket devices positioned on the front end of said main frame for attachment to a three point hitch on a tractor.

3. A personnel carrier as defined in claim 2 wherein: said skid means comprises a pair of ground engaging skids attached to the rear end of said main frame on opposite sides thereof, whereby the weight of said personnel carrier is supported primarily by said skids and the three point hitch of a tractor, and said wheel means permit said wing sections to traverse uneven terrain.

4. A personnel carrier as defined in claim 1 wherein: said wing sections angle forwardly and outwardly with the outer ends thereof being more forwardly disposed with respect to the direction of carrier transit than said inner end segments thereof.

5. A personnel carrier as defined in claim 4 wherein: said wheel means comprises a ground engaging wheel on the outer end of each of said wing sections on the feed side thereof, whereby said wheels prevent said wing sections from digging into unevent terrain.

6. A personnel carrier as defined in claim 1 wherein: said skid means comprises a pair of skids attached to opposite sides of said main frame, each of said skids having an elongated tracking rod on the bottom thereof, and said skids being laterally spaced so as to be in alignment with a pair of laterally spaced wheels on a towing vehicle, whereby said rods will track and slidably support said main frame in the tracks of said tractor wheels.

7. A personnel carrier adapted to be attached to a vehicle for carrying workers through fields in order to perform crop handling or weed control operations, comprising:
a main frame having means thereon for attachment to a vehicle for conveying the personnel carrier through a field;
a pair of wing sections having platform means thereon for supporting workers, said wing sections being supported at their inner ends on said main frame and extending horizontally outwardly from said inner end on opposite sides of said main frame at an angle of between 20° and 70° with respect to the longitudinal axis of said main frame to thereby provide workers on said wing sections with a side view of row crops during transit of said carrier through a field, said platform means being spaced from the ground so as to allow weed control operations to be performed therefrom; and
ground engaging means supporting said main frame and said wing sections for transit.

8. A personnel carrier as defined in claim 7 wherein: said wing sections extend outwardly and forwardly from said main frame at an angle of approximately 45° with respect to the longitudinal axis of said main frame.

9. A personnel carrier as defined in claim 7 wherein: said ground engaging means comprises a pair of skids attached to said main frame on opposite sides thereof and a pair of wheels on the outer ends of said wing sections, with the weight of said personnel carrier being supported primarily on said skids.

10. A personnel carrier as defined in claim 7 wherein: said ground engaging means comprises a pair of skids attached to said main frame on opposite sides thereof in alignment with a pair of laterally spaced wheels on a towing tractor; and an elongated tracking rod on the bottom of each of said skids, whereby said rods will track and slidably support said main frame in the tracks of said tractor wheels.

* * * * *